US010253685B2

(12) United States Patent
Alexander et al.

(10) Patent No.: US 10,253,685 B2
(45) Date of Patent: Apr. 9, 2019

(54) METHOD AND SYSTEM FOR IMPROVING FUEL ECONOMY AND REDUCING EMISSIONS OF INTERNAL COMBUSTION ENGINES

(71) Applicant: dynaCERT Inc., Toronto (CA)

(72) Inventors: Robert Alexander, Huntsville (CA); Geoffrey Sheerin, Sarnia (CA); Klaus Tomantschger, Mississauga (CA)

(73) Assignee: dynaCERT Inc., Toronto (CA)

( * ) Notice: Subject to any disclaimer, the term of this patent is extended or adjusted under 35 U.S.C. 154(b) by 13 days.

(21) Appl. No.: 14/423,602

(22) PCT Filed: Aug. 22, 2013

(86) PCT No.: PCT/CA2013/000737
§ 371 (c)(1),
(2) Date: Feb. 24, 2015

(87) PCT Pub. No.: WO2014/029015
PCT Pub. Date: Feb. 27, 2014

(65) Prior Publication Data
US 2015/0226113 A1    Aug. 13, 2015

Related U.S. Application Data

(60) Provisional application No. 61/692,766, filed on Aug. 24, 2012.

(51) Int. Cl.
*F02B 43/12* (2006.01)
*F02M 21/02* (2006.01)
(Continued)

(52) U.S. Cl.
CPC .............. *F02B 43/12* (2013.01); *F02D 19/08* (2013.01); *F02D 41/0002* (2013.01);
(Continued)

(58) Field of Classification Search
CPC .... F02B 43/12; F02B 2043/106; F02B 43/00; F02D 41/0002; F02D 41/30
(Continued)

(56) References Cited

U.S. PATENT DOCUMENTS 3,672,341 A     6/1972   Smith et al.
3,862,624 A *   1/1975   Underwood ............ F02B 43/10
                                                  123/25 B
(Continued)

FOREIGN PATENT DOCUMENTS

AU      2015218446 A1     3/2017
CA         1113037 A     11/1981
(Continued)

OTHER PUBLICATIONS

International Search Report and Written Opinion dated Dec. 17, 2013 in corresponding International Patent Application No. PCT/CA2013/000737.
(Continued)

*Primary Examiner* — Syed O Hasan
(74) *Attorney, Agent, or Firm* — Bereskin & Parr LLP/S.E.N.C.R.L., s.r.l.

(57) ABSTRACT

A method and system for improving the fuel economy and lowering the emissions of internal combustion engines by injecting predetermined amounts and ratios of on-board or locally generated hydrogen and oxygen to the engine's air intake and varying the gas addition volume and hydrogen/oxygen ratio as a function of the operating conditions, e.g., in line with the instant engine load.

19 Claims, 5 Drawing Sheets

(51) Int. Cl.
  *F02M 25/12* (2006.01)
  *F02D 19/08* (2006.01)
  *F02D 41/00* (2006.01)
  *F02D 41/30* (2006.01)
  *F02B 43/10* (2006.01)

(52) U.S. Cl.
  CPC ......... *F02D 41/0027* (2013.01); *F02D 41/30* (2013.01); *F02M 21/02* (2013.01); *F02M 25/12* (2013.01); *F02B 2043/106* (2013.01); *Y02T 10/32* (2013.01); *Y02T 10/36* (2013.01)

(58) Field of Classification Search
  USPC .............................. 123/3; 205/628; 204/242
  See application file for complete search history.

(56) References Cited

U.S. PATENT DOCUMENTS

| | | | |
|---|---|---|---|
| 4,028,208 A | 6/1977 | Giacopelli | |
| 4,111,160 A | 9/1978 | Talenti | |
| 4,112,875 A | 9/1978 | Laumann et al. | |
| 4,369,737 A | 1/1983 | Sanders et al. | |
| 4,392,937 A | 7/1983 | Schmitt et al. | |
| 4,403,645 A | 9/1983 | MacCracken | |
| 4,442,801 A * | 4/1984 | Glynn | C25B 9/06 123/3 |
| 4,784,700 A | 11/1988 | Stern et al. | |
| 5,105,773 A | 4/1992 | Cunningham et al. | |
| 5,450,822 A | 9/1995 | Cunningham | |
| 6,332,434 B1 | 12/2001 | De Souza et al. | |
| 7,398,644 B2 | 7/2008 | Leone et al. | |
| 7,819,091 B2 | 10/2010 | Sego | |
| 7,832,197 B2 | 11/2010 | Leone | |
| 7,861,520 B2 | 1/2011 | Broderick et al. | |
| 8,186,315 B2 | 5/2012 | Jeffs et al. | |
| 8,691,070 B1 | 4/2014 | Burkett et al. | |
| 2003/0024489 A1 | 2/2003 | Balan et al. | |
| 2006/0090712 A1 | 5/2006 | Ehresman | |
| 2006/0180101 A1* | 8/2006 | Monette | F02B 43/10 123/3 |
| 2007/0042244 A1* | 2/2007 | Spallone | H01M 8/04388 429/421 |
| 2008/0017137 A1 | 1/2008 | VanHoose et al. | |
| 2008/0302670 A1 | 12/2008 | Oyle | |
| 2010/0175941 A1 | 7/2010 | Khodabakhsh | |
| 2010/0183931 A1* | 7/2010 | Hedman | C01B 3/042 429/428 |
| 2011/0094456 A1 | 4/2011 | Dee et al. | |
| 2011/0174241 A1* | 7/2011 | McConahay | C25B 9/063 123/3 |
| 2011/0185990 A1* | 8/2011 | Inwald | F02M 25/12 123/3 |
| 2011/0253070 A1 | 10/2011 | Haring | |
| 2011/0303194 A1 | 12/2011 | Fong et al. | |
| 2012/0111734 A1 | 5/2012 | Kramer | |
| 2012/0298054 A1 | 11/2012 | Dinsmore | |
| 2013/0037003 A1 | 2/2013 | Sheerin | |
| 2013/0174797 A1 | 7/2013 | Owens | |
| 2014/0262819 A1 | 9/2014 | Orbes et al. | |
| 2014/0290595 A1 | 10/2014 | Owens | |
| 2015/0040844 A1 | 2/2015 | Goldman et al. | |
| 2015/0101926 A1 | 4/2015 | Burns | |
| 2015/0226113 A1 | 8/2015 | Alexander et al. | |
| 2018/0112608 A1 | 4/2018 | Bridge et al. | |

FOREIGN PATENT DOCUMENTS

| | | |
|---|---|---|
| CA | 2412367 A1 | 5/2004 |
| CA | 2449538 A1 | 5/2005 |
| CA | 2546166 A1 | 5/2005 |
| CN | 101255832 A | 9/2008 |
| CN | 101975108 A | 2/2011 |
| DE | 102011000655 A1 | 8/2011 |
| GB | 1263881 A | 2/1972 |
| GB | 2073317 A | 10/1981 |
| GB | 2461375 A | 1/2010 |
| GB | 2479404 A | 10/2011 |
| WO | 2007/130571 A2 | 11/2007 |
| WO | 2008/154721 A1 | 12/2008 |
| WO | 2011/027309 A2 | 3/2011 |
| WO | 2011/031763 A1 | 3/2011 |
| WO | 2011/124921 A1 | 10/2011 |
| WO | 2011/127583 A1 | 10/2011 |
| WO | 2013/138915 A1 | 9/2013 |
| WO | 2014/110295 A2 | 7/2014 |
| WO | 2016/064289 A1 | 4/2016 |

OTHER PUBLICATIONS

International Preliminary Report on Patentability dated Feb. 24, 2015 in corresponding International Patent Application No. PCT/CA2013/000737.

International Search Report and Written Opinion dated Jul. 8, 2011 in related International Patent Application No. PCT/CA2011/000421.

International Preliminary Rreport on Patentability dated Oct. 16, 2012 in related International Patent Application No. PCT/CA2011/000421.

Restriction Requirement dated Nov. 10, 2014 in related U.S. Appl. No. 13/641,005.

Search Report dated Jun. 17, 2014 in related CN Patent Application No. 201180023927.1.

First Office Action dated Jun. 27, 2014 in related CN Patent Application No. 201180023927.1.

International Search Report and Written Opinion dated Jul. 10, 2013 in related International Patent Application No. PCT/CA2013/000273.

International Preliminary Rreport on Patentability dated Sep. 23, 2014 in related International Patent Application No. PCT/CA2013/000273.

International Search Report and Written Opinion dated Dec. 11, 2017 in related International Patent Application No. PCT/CA2017/051145.

Non-final Office Action and Notice of References Cited dated May 30, 2018 in related U.S. Appl. No. 15/298,783.

* cited by examiner

METHOD AND SYSTEM FOR IMPROVING FUEL ECONOMY AND REDUCING EMISSIONS OF INTERNAL COMBUSTION ENGINES

CROSS-REFERENCE TO RELATED APPLICATION

This national application claims priority from International Patent Application No. PCT/CA2013/000737, filed on Aug. 22, 2013 which claimed priority from U.S. Provisional Patent Application No. 61/692,766, filed on Aug. 24, 2012, which are incorporated herein by reference.

FIELD OF THE INVENTION

The present invention discloses a method and a system for improving the combustion and fuel economy of internal combustion engines operating under varying load conditions, in particular, diesel (or "compression ignition") engines, by injecting varying ratios and volumes of preferably on-board (or locally in the case of stationary generators) generated hydrogen and oxygen into the air intake. The invention provides a means for continuously monitoring, controlling and adjusting (i) the total volume of added $H_2$ and $O_2$ gases and (ii) the specific ratio between $H_2$ and $O_2$. The invention monitors a number of engine parameters and uses algorithms to relate the "instant operating conditions" to the ideal $H_2/O_2$ volume addition and gas ratio.

BACKGROUND OF THE INVENTION

Driven by concerns over global warming caused by greenhouse gases, many attempts have been made to improve the energy efficiency of combustion engines, including spark-ignition and diesel (or more specifically, "compression ignition") engines, particularly since they are large contributors to many greenhouse gases and other harmful emissions such as carbon monoxide, unburned hydrocarbons, nitrous oxides ($NO_x$) and in the case of diesel engines, particulate matter. Often the approach has focused on emission reductions at the expense of combustion efficiency and fuel economy. For instance, exhaust gas recirculation ("EGR") has been used, in an attempt to reduce $NO_x$ emissions in, e.g., diesel engines. Nitrous oxides form when nitrogen and oxygen are mixed together (e.g., in air), and the mixture is subjected to high temperatures. At high temperatures, $N_2$ and $O_2$ in air disassociate into their atomic states, and a series of chemical reactions result in nitrous oxides. EGR systems introduce cooled exhaust gas into the combustion chamber and reduce $NO_x$ via two mechanisms: firstly the exhaust gas is $CO_2$ rich which has a higher heat content and therefore causes the combustion chamber's temperature to be significantly lower; and secondly, the exhaust gas has a lower oxygen content. The lower temperature and reduction in oxygen decrease the $NO_x$ formation. However, EGR systems have not provided all the benefits expected as they have been mechanically unreliable and have also resulted in lower overall fuel economy. With economic conditions requiring relatively stable amounts of energy demand per year (e.g. haulage (tons-miles) for freight, electrical power (watt hours) for power generators), the introduction of these "emission technologies" (EGR, and selective catalytic reduction "SCR") has generally led to lower overall fuel economy and efficiency, and therefore higher greenhouse gas emissions that vary directly with fuel usage (i.e. carbon content in the diesel fuel or heavy fuel oil). These technologies have also increased the cost of engines and the annual operating cost of diesel truck owners or power generators due to higher fuel usage, higher maintenance costs, and higher running costs to support the emissions technologies (e.g. particulate filters, urea for SCR etc.).

The prior art reports numerous attempts to add hydrogen ($H_2$) and/or oxygen ($O_2$) to the pre-combustion mixture to improve combustion efficiency of internal combustion engines. Numerous mechanisms come into play. Hydrogen alone is well known to be an effective fuel with a high caloric value (119.8 MJ/kg versus 42.7 for diesel) and zero carbon residual. The prior art describes the addition of hydrogen and/or oxygen gas to combustion engines to improve fuel economy, including on-board produced hydrogen from the electrolysis of water. The energy required to produce hydrogen from the engine fuel with an "on demand" electrolysis system, however, exceeds the energy content available from the combustion of the hydrogen and there is some controversy about the benefits of such systems. The prior art also suggests, e.g., to combine the added hydrogen with excess oxygen, to produce steam to be subsequently introduced into the combustion chamber to cool the burn at the flame front. This has at times shown reductions in emissions and increased fuel economy.

The inventors believe that a better way to understand the impact of hydrogen is as a diesel or gasoline combustion enhancer. Specifically, hydrogen has a much faster flame speed than, e.g., diesel (2.7 m/s versus 0.3 m/s), higher ignition temperature (585° C. vs. 280° C.), much lower density than carbonaceous fuels and air, and a high diffusivity in air. While the concentration of hydrogen used in this invention is below the lower explosive limit (4% in air), once the diesel ignites, the hydrogen tends to increase the speed of combustion. Likewise the oxygen impacts combustion. Oxygen enriched fuel mixtures tend to burn hotter and faster than standard air mixtures, and addition of oxygen effectively lowers the fuel to air ratio (leaning the fuel to air ratio) and reduces nitrogen in the combustion chamber.

Rhodes et. al. in U.S. Pat. No. 3,262,872 (1966), discloses the use of water electrolysis to produce mixed HHO or Brown's Gas and to inject this mixed gas into the air intake of diesel engines alone with air in trace amounts.

Bari et. al. in Fuel 89 (2010) 378-383; "Effect of $H_2/O_2$ Addition in Increasing the Thermal Efficiency of a Diesel Engine" showed that the introduction of relatively small quantities of mixed, stoichiometric $H_2/O_2$ (or "Browns" or "HHO" or "hydroxyl") gas produced in the same ratio obtained from the electrolysis of water, increases the thermal efficiency of diesel engines. Bari demonstrated that the primary mechanism for fuel savings is an increase in thermal efficiency (or "combustion efficiency"), i.e., the percentage of the combustion heat energy that is transmitted into the crank of the engine versus being lost in other forms (e.g. in the heat of exhaust, or in other engine heat losses) is enhanced. Essentially the Browns gas tends to concentrate the combustion in that portion of the cycle where more power can be transmitted to the crank by improving the work (i.e. force times distance) imparted to the piston. As indicated above, this research points to the impact of the hydrogen and oxygen as potential diesel fuel combustion enhancers. However, this work demonstrated that relatively high volumes of $H_2/O_2$ gas are required to significantly reduce fuel consumption. Approximately 30 l/min is injected into a 4 l diesel engine to produce fuel economy savings of 15% (i.e., gas input per minute to engine displacement of 7.5 for a 4 stroke engine).

Sheerin in WO 2011/127,583 discloses the addition of non-elemental (i.e. non-stoichiometric) and pre-determined ratios of both hydrogen ($H_2$) and oxygen ($O_2$) to the pre-combustion mixture (i.e., into the air intake) of diesel engines to improve the combustion efficiency with trace additions of gas. The ratio of gases is being held constant while the engine experiences various operating conditions (e.g. loading). These systems work well to improve combustion when load operating conditions are relatively constant and the system can be "tuned" to a narrow operating window.

SUMMARY OF THE INVENTION

The Applicants of this invention have surprisingly discovered a technology which has much broader applicability and provides more consistent improvement in fuel economy than prior art systems over a wide range of operating conditions, e.g., load conditions, by continuously monitoring and controlling the total volume and ratio of hydrogen and oxygen added to the air intake of combustion engines.

It is therefore an objective of the present invention to provide different ratios and volumes of hydrogen and oxygen gas to the air-intake of internal combustion engines to maximize the fuel economy and/or minimize emissions over a wide range of operating conditions.

It is an objective of the present invention to provide a manual, partly-automated or fully automated monitoring and control system which determines the optimum or preferred gas ratios and gas volumes on an ongoing basis during the entire operation of the engine and as operating conditions change, adjusts the gas volume and ratios accordingly, and without much lag time feeds the optimized gas volume and ratio into the engine's air-intake to maximize fuel mileage and minimize emissions.

It is an objective of the present invention to provide total gas volume additions to the combustion engine which tend to be high at low instant engine loads and low at high engine loads.

It is an objective of the present invention to use hydrogen/oxygen gas ratios which are low at low instant engine loads, i.e., oxygen rich (hydrogen/oxygen ratio in the range of 1/1 to 1/10 and as high 1/100), and are high at high engine loads, i.e., hydrogen rich (hydrogen/oxygen ratio in the range of 2/1 to 10/1 and as high 100/1).

It is an objective of the present invention to provide total combined hydrogen and oxygen gas volumes to the combustion engine dependent on the instant engine loads, in the range of 0.01 to 5 liter per minute per liter of engine displacement assuming a four stroke engine (or twice this amount for two stroke engines).

It is an objective of the present invention to provide a monitoring and control system which can be added to both older pre-EGR engines, and the new EGR and SCR engines ensuring that engine sensors (e.g., $O_2$ sensors) do not "mistakenly" counter the fuel savings offered by the separate introduction of varying ratios and volumes of $H_2$ and $O_2$ gas. Specifically, theses sensors determine how much exhaust gas is introduced (since $NO_x$ formation and $O_2$ tend to be highly correlated) into the air-intake and determine the optimal fuel/air ratio.

It is an objective of the present invention to provide a method and system of further improving the fuel economy in combustion engines including diesel and gasoline engines that addresses or mitigates one or more of the disadvantages and hindrances of the prior art.

It is an objective of the present invention to provide a system which includes a source of both hydrogen ($H_2$) and oxygen ($O_2$), preferably generated on-board or locally in the case of stationary generators by electrochemical means, and the ability to meter these gases in varying ratios and quantities depending on a suitable algorithm.

It is an objective of the present invention to provide a monitoring and control system which determines and provides the ideal ratios and volumes of hydrogen and oxygen to the air intake depending on different operating parameters, including, but not limited to, the RPM, the fuel flow, the average engine loading (e.g., depending on winds, hills, loads, or power demand etc.), whether or not the engine has an EGR system, and the exhaust emissions.

It is an objective of the present invention to provide a software system capable of determining the ideal hydrogen and oxygen gas ratios and volume and to optimize the system performance for each specific engine configuration.

It is an objective of the present invention to provide a system that monitors engine exhaust parameters in near real-time and accordingly determines and adjusts the addition of the hydrogen ($H_2$) and oxygen ($O_2$) to the air intake, thus allowing the system to improve fuel economy, minimizing harmful emissions on a number of combustion engines, including, but not limited to state-of-the-art diesel engines with newer EGR and SCR technology installed.

It is an objective of the present invention to provide an on-board or local water electrolysis system which is used to produce hydrogen and oxygen on-demand, optionally has the ability to store excess hydrogen and/or oxygen generated in a storage buffer and optionally contains an auxiliary energy system, e.g., a hydrogen fuel cell which, at times, can be used to generate electrical energy from the excess hydrogen with oxygen and/or air.

It is an objective of the present invention to generate hydrogen and oxygen on board or locally from the energy of the engine fuel using electrochemical means, e.g., using a water electrolysis system for generating hydrogen and oxygen using electrical energy from the alternator and, optionally, an additional oxygen using an electrochemical oxygen concentrator which cathodically reduces air and anodically liberates pure oxygen.

It is an objective of the present invention to provide on-board or local storage for hydrogen and oxygen to provide a suitable "buffer" to enable the rapid change in gas ratios and volumes to be fed to the air intake of the combustion engine as required.

It is an objective of the present invention to provide a monitoring and control system which has the ability to rapidly respond to the changing needs of the combustion engine to achieve and maintain maximum fuel efficiency and minimum emissions by keeping the lag time between the determination of the ideal fuel volume and gas ratio to the time this "adjusted ideal mix" is fed into the air intake to less than 5 minutes, preferably less than 2 minutes more preferably less than 1 minute.

It is an objective of the present invention to provide a monitoring and control system which samples the relevant engine data in minimum time intervals of a day, preferably an hour, more preferably 10 minutes and even more preferably 1 second to determine the ideal fuel volume and gas ratio to be dispensed to the air-intake.

It is an objective of the present invention to provide a monitoring and control system wherein at least one of the control logic subsystems and the metering subsystem is a manual system and where the operator or driver manually adjusts gas volumes and ratios based on trip data provided by the vehicle or engine Electronic Control Module ("ECM").

It is an objective of the present invention to provide a monitoring and control system wherein the decision logic uses regression analysis of at least one engine operating condition as an independent variable selected from the group consisting of average trip engine load (preferably derived from data that is independent of fuel consumption), average engine load in a period exceeding at least 1 minute, average engine RPM, average vehicle speed, power demand regressed against either fuel economy or fuel consumption to determine optimal gas ratios and volume settings.

It is an objective of the present invention to provide a monitoring and control system which reduces the emissions of internal combustion engines, e.g., in the case of pre-EGR diesel engines using the FTP emissions testing protocol, reducing the unburned hydrocarbons by 1%-50% versus emissions without the invention, preferably less than 1.3 grams per brake horsepower hour ("g/bhp-hr") and most preferably less than 0.2 g/bhp-hr, carbon monoxide by 1%-95% versus emissions without the invention, preferably less than 15.5 g/bhp-hr and most preferably less than 2 g/bhp-hr, and particulate matter by 1%-50%, preferably less than 0.1 g/bhp-hr and most preferably less than 0.05 g/bhp-hr.

Accordingly, the invention in one exemplary embodiment provides for a monitoring and control system for a combustion engine capable of increasing the fuel economy by at least 2.5%, preferably by at least 5%, more preferably by at least 10% and most preferably by at least 15% when compared to operation of the internal combustion engine without the addition of hydrogen, and/or with fixed amounts and/or fixed ratios of hydrogen and oxygen.

Accordingly, the invention in one exemplary embodiment provides for a monitoring and control system for a combustion engine, increasing the fuel economy over the entire range of load conditions, ranging from 20 to 50%, preferably from 10 to 70%, more preferably from 5 and 95% and most preferably from 0 to 100%.

Accordingly, the invention in one exemplary embodiment provides for a monitoring and control system for improving the fuel economy of an internal combustion engine, the system comprising:
(i) a source of hydrogen gas and oxygen gas;
(ii) a metering subsystem connectable to an air intake of the internal combustion engine, the subsystem adapted to provide varying ratios and volumes of hydrogen gas and oxygen gas to the air intake of said internal combustion engine; and
(iii) a control logic subsystem adapted to continuously monitor engine operating parameters and control the metering subsystem to adjust the ratio of hydrogen gas and oxygen gas and the total volume thereof injected into the air intake of said internal combustion engine to enhance the fuel economy thereof.

Preferably, said internal combustion engine is a compression ignition engine having at least one combustion chamber in which fuel is injected and air is compressed for combustion of the fuel.

Preferably the engine operating parameters are instant engine load and/or fuel flow rate and the fuel economy when compared to fuel economy without the monitoring and control system in the instant load range between 0 and 100% monitoring changes of at least 2.5%.

Preferably, the monitoring and control system is installed on a vehicle and said hydrogen gas and oxygen gas are generated on-board the vehicle electrochemically from energy provided by fuel.

Preferably, said instant load range is between 20% and 50% in the case of transport engines, and between 20% and 100% in the case of power generators and all other engines.

Preferably, said fuel mileage or fuel consumption is improved by at least 5%.

Preferably, said ratio between the hydrogen gas and the oxygen gas varies in the range of 10/1 to 1/10.

Preferably, said total volume of the hydrogen gas and the oxygen gas is in the range of 0.01 to 5 liter per minute per liter of engine displacement.

Preferably, at least one of the control logic subsystems and the metering subsystem is a manual system and where the operator manually adjusts gas volumes and ratios based on trip data provided by a vehicle ECM.

Preferably, the control logic subsystem and metering system are automated and wherein the monitoring time interval is equal to or less than once a day.

Preferably, the monitoring time interval is approximately 1 second or less.

Preferably, the control logic subsystem is located at a central data hub which is remote from the internal combustion engine and data is transmitted wirelessly.

Preferably, the control logic subsystem is located proximate to the internal combustion engine.

Preferably, the decision logic uses regression analysis of at least one of the engine operating conditions as an independent variable selected from the group consisting of: instantaneous drive engine load, average drive engine load; average percentage time at load; average overall engine load, instantaneous revolutions per minute, average revolutions per minute; average percentage time at revolutions per minute, instantaneous speed; average speed, vehicle speed limit, instantaneous trip miles travelled, average trip miles travelled, instantaneous odometer mileage, idle, average idle percentage, instantaneous percentage EGR, average percentage EGR, instantaneous oxygen levels, average oxygen levels, diesel particulate regeneration, instantaneous ambient air temperature, average ambient air temperature, fuel type, average load requirement, average gross vehicle weight, instantaneous GPS positioning, average GPS positioning, instantaneous wind data, average wind data, instantaneous accelerometer reading, average accelerometer reading, instantaneous calculated engine load, average calculated engine load, flat expected topography, hilly expected topography, mountainous expected topography, and combinations thereof, regressed against at least one dependant variable selected from the group of instantaneous or average fuel economy, fuel consumption, brake specific fuel consumption, power generation per BTU, thermal efficiency, NOx, NMHC, CO, CO2, Particulate Matter concentrations, and combinations thereof to determine optimal gas ratios and volume settings.

Preferably, the decision logic uses a statistical method on engine operating condition data to determine the optimal gas ratio and volume settings for improved combustion, fuel economy or thermal efficiency.

Preferably, the monitoring and control system further comprises at least one of, a storage tank to store excess hydrogen and/or oxygen, and an auxiliary power system which converts excess hydrogen into electrical power.

Preferably, the monitoring and control system further comprises an electrochemical oxygen concentrator which cathodically reduces air and anodically liberates pure oxygen.

Preferably, the monitoring and control system further comprises a recalibrator to recalibrate the engine's reaction to oxygen in the exhaust so as to improve the impact of said monitoring and control system on fuel economy, such recalibrator including a specialized circuit that modifies readings from one or more oxygen sensors, a means of adjusting the oxygen reading, or engine ECM software changes that accomplish same.

Another exemplary embodiment provides a method for improving the fuel economy of an internal combustion by at least 2.5% comprising the steps of:
  (i) continuously monitoring engine operating parameters;
  (ii) determining an optimum ratio of hydrogen gas and oxygen gas to be added to the air intake;
  (iii) determining an optimum total hydrogen gas and oxygen gas volume to be added to the air intake; and
  (iv) varying ratios and volume of hydrogen gas and oxygen gas volume and delivering the gases to the air intake of said internal combustion engine.

Preferably, the method further comprises the step of providing at least part of the hydrogen and oxygen gas by means of water electrolysis.

As used herein the term "gas ratio" is defined as the volumetric ratio between hydrogen gas and oxygen gas added to the air intake of the combustion engine according to the present invention and in addition to the oxygen provided for by the air in the air/fuel mixture As used herein the term "instant engine load" or "instantaneous engine load" is a measure of actual load (i.e. determined in a tractor by load weight, road grade, accelerations etc. or in a power generator by electrical power demand and other load factors) defined as the engine load as calculated as a percentage of total engine output by an on-board or local computer control system and made available on the Controller Area Network ("CAN") bus. Preferably this "load" is calculated in a method that ensures some independence (i.e. statistically not 100% correlated) from the fuel economy/efficiency calculations, e.g. through an auxiliary monitoring system. Ideally this data source is completely independent of fuel economy. Often though, the "instant engine load" is calculated by the vehicle electronic control module (ECM) based on the fuel flow rate relative to wide open throttle adjusted for ambient temperature and pressure, and as a function of RPM. This is one of the least preferred control parameters used to determine the optimal total hydrogen and/or oxygen volume additions and the appropriate ratios to maximize fuel economy and minimize emissions since it is highly or total correlated with fuel economy calculations.

As used herein the term "average engine load" is defined as the average of the "instantaneous engine load" or some estimate thereof that represents the actual engine load experience over a specific trip or time.

BRIEF DESCRIPTION OF THE DRAWINGS

The invention will be better understood with reference to the attached drawings, in which.

DETAILED DESCRIPTION

Figure 1:
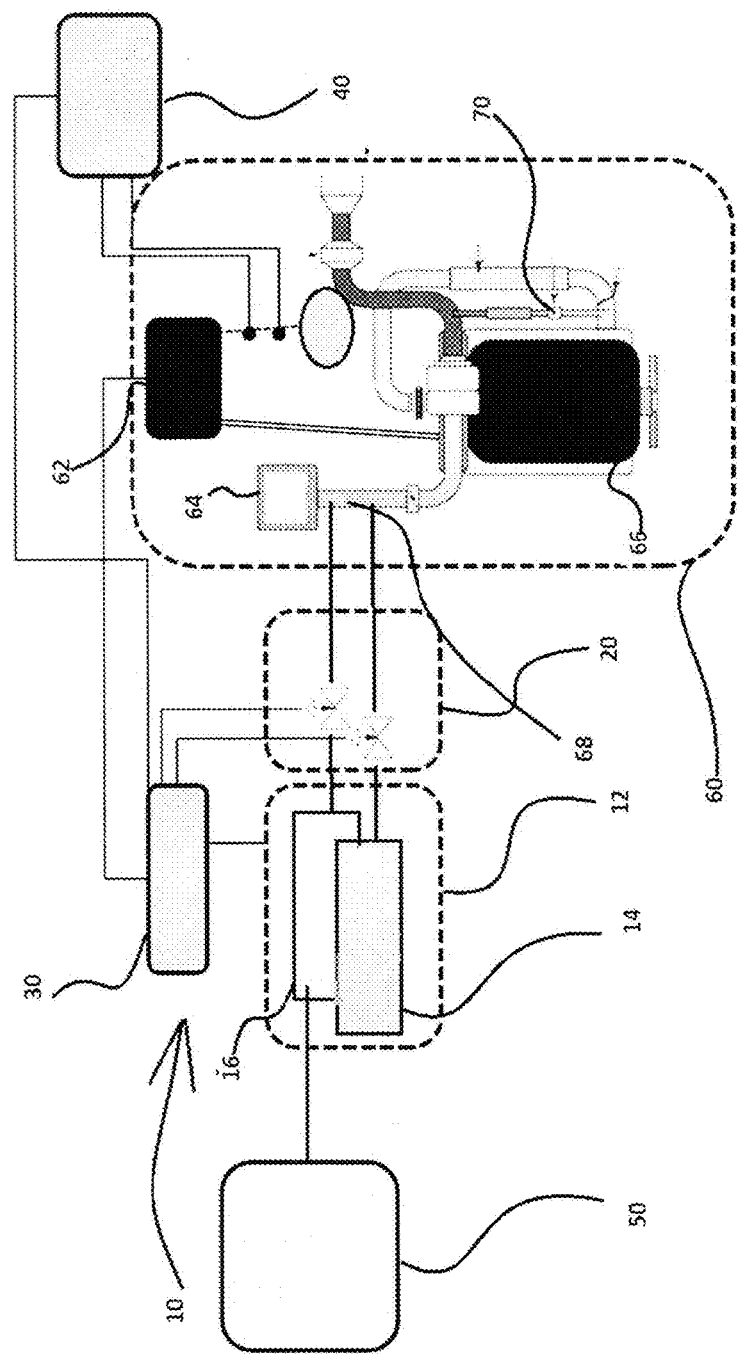
FIG. 1 is a schematic diagram showing elements of the invention for a system installed on a diesel engine, recognizing that multiple sources of hydrogen and oxygen are possible and that the addition of a pre-combustion chamber is not necessary. For engines equipped with EGR and related sensors, a signal modification device (or "means") will further improve performance by recalibrating the sensor logic given the addition of hydrogen and oxygen. If excess hydrogen is available, a fuel cell can be utilized to further improve energy efficiency.

FIG. 1 is a schematic drawing showing the basic elements of the monitoring and control system 10 according to the present invention and their integration into an existing or new diesel engine system although, as highlighted, the inventive system is equally suitable for all combustion engines operating on carbon-based fuels. Specifically, the invention requires a source 12 of pure or almost pure (at least 90%) $H_2$, shown in FIG. 1 as item 16, and $O_2$, shown in FIG. 1 as item 14. These preferably include on-board or local, on-demand water electrolysis devices (wet or dry technology) or bulk storage or any other source. These gases are metered at specific ratios and volumes by metering device 20 and depending on control logic 30 that utilizes operating conditions received, for example, from the engine electronic control module ("ECM") 62 including for example, engine load, engine rotations per minute (RPMs) and other readily available and independently assessed engine data from the diesel engine system 60, such metering device 20 being either manually controlled (i.e. set according to calculated "ideal ratios and volumes") or automatically (i.e. using the aspect described below and in FIG. 2). These gases are fed from the metering device 20 to the air intake 68 of the diesel engine 66, either prior to the air filter 64, or after the air filter and preferably prior to the turbo charger (if applicable). If excess hydrogen is available from source 12, this hydrogen can be stored for future use (caution must be taken to store hydrogen that is not 100% pure), or preferably used to power a fuel cell 50 to generate auxiliary electrical power. If engine 60 is equipped with an EGR system, a signal modification device 40 or equivalent ECM software changes will likely be necessary to optimize results. The type of enhancement or software change required will vary by engine and operating set up and will need to take into account impacts on emissions including particulate matter, hydrocarbons and $NO_x$. Care must be taken to ensure that emissions do not exceed the regulatory standards for the engine. These engine systems apply to the full range of compression ignition engine applications including heavy truck, marine, rail, stationary and moveable generators, construction, mining, industrial, agricultural, and military equipment and vehicles and engine emission technology types with and without the use of EGR systems. Similarly, the other combustion engines can be used such as spark ignition based engines operating on gasoline fuel.

Figure 2:
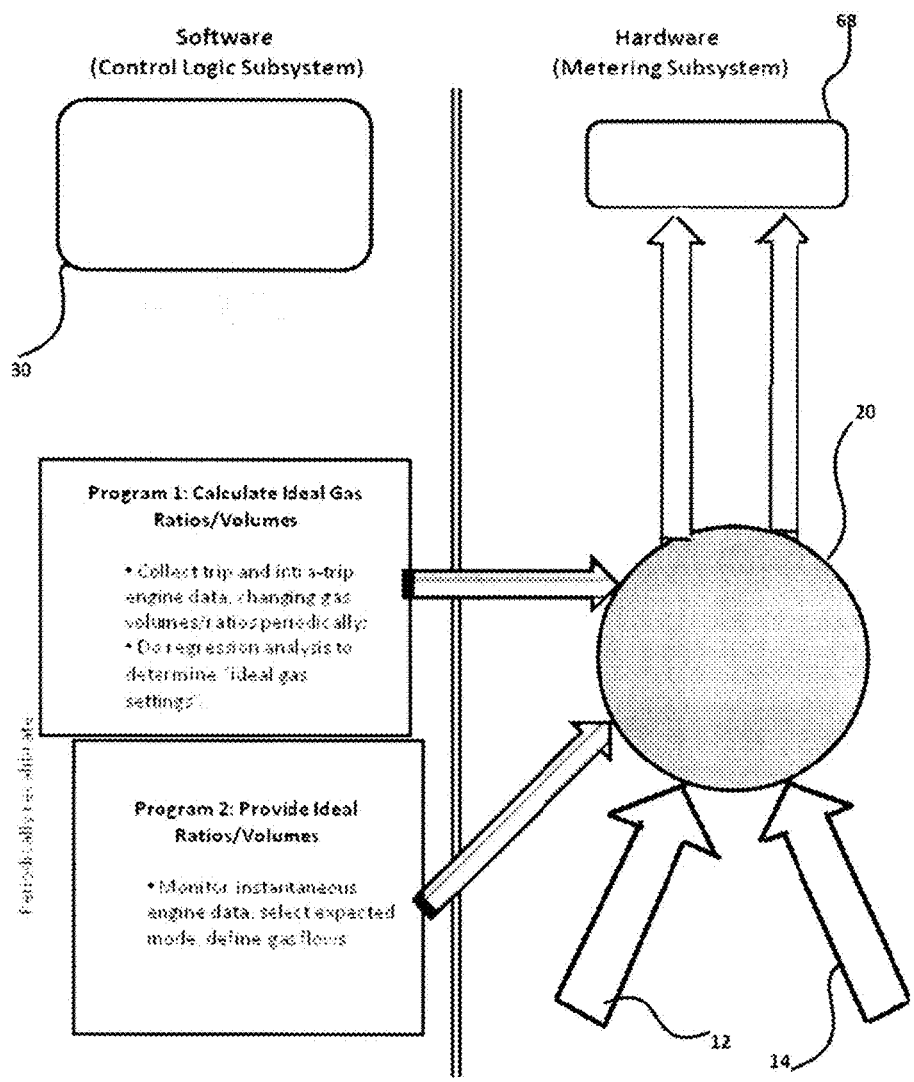
FIG. 2 is a schematic diagram of an embodiment of the invention that uses a "self-tuning" software system that periodically calculates the "ideal gas volumes and ratios" depending on operating conditions ensuring that fuel economy is consistently improved as operating conditions vary, and facilitating the addition of this system as a retro-fit on existing engines currently in operation.

FIG. 2 provides an overview of both the software (Control Logic 30 in FIG. 1) and hardware (Metering System 20) that make up the invention and one of its embodiments in the form of a flowchart. From a hardware perspective, the system consists of a source of pure or reasonably pure hydrogen 16 and oxygen gas 14, available in a range of quantities equivalent to total gas input per minute relative to engine displacement of between 5% and 30% for pre-EGR engines, and between 5% and 40% for EGR engines (i.e., for a 14 liter engine, the total range of gas addition preferably amounts to a range of at least 0.7 liters per minute ("lpm") to 4.2 lpm for a pre-EGR engine and a range of at least 0.7 lpm to 5.6 lpm for EGR enabled engines) The hardware also includes a Valve Control/Mixing system 20 that allows the software system to select likely ratios and gas volumes based on potential ideal operating situations. Note that for an electrolysis device, this may also include a way to vary voltage and current and thus gas production. The software system uses standard engine data available on most diesel engine control systems ("CAN data") including fuel economy, engine load and trip data. Table 1 below lists a number of the inputs that have proven useful to calculate the ideal gas mixtures and volumes for various engine, transmissions and applications. Note that some of this data may not be available on the vehicle/engine ECM (e.g. emissions data) and can be input separately, e.g., manually or through a separate monitoring system (e.g. fleet management tool). This system includes a sufficient amount of memory to capture data over multiple days and trips of engine operation. Program 1 executes first and determines the calculated ideal ratio/volumes of hydrogen and oxygen while monitoring the "dependant variables". To determine these ideals for various operating situations, the software will run fuel economy tests (or other efficiency tests for non-road engines), modifying the Valve Control/Mixing system in the first few days and trips (or "jobs") of operation to develop a valid data set. After the range of settings has been explored, the ideal operating profile is created which is then used by Program 2 to take over the control of the Valve Control/mixing system based on instantaneous readings from the engine control module ("ECM").

The control logic subsystem and/or the metering subsystem can be a manual system, requiring human intervention to perform either or both of the monitoring and control functions, alternatively, in a preferred embodiment, the decision logic, or metering functions can be fully automated. Moreover, these programs can be executed either locally (i.e. in the case of a truck, in a stand alone control system), or remotely by transmitting data to a central data hub, or a combination of the two.

The monitoring and control system 10 can use logic regression analysis of at least one engine operating condition or parameter (e.g. average trip engine load) or other statistical methods to determine optimal gas ratio and volume settings.

TABLE 1

Suitable Monitoring and Control Data Inputs and Outputs

| Independent Variables | Input | Dependent Variables | Input |
|---|---|---|---|
| Drive engine load | I/A | Fuel economy | I/A |
| Percentage time at load | A | Fuel consumption | I/A |
| Overall engine load | A | BSFC (if available) | I/A |
| RPM | I/A | Power generation per BTU | I/A |
| Percentage time at RPM | A | | |
| Speed | I/A | | |
| Vehicle Speed Limit | Y/N | | |
| Trip Miles travelled | I/A | | |
| Odometer mileage | I | Non ECM data (emissions primarily) | |
| Idle | Y/N | $NO_x$ levels | I/A |
| Idle Percentage | A | NMHC levels | I/A |
| % EGR | I/A | CO levels | I/A |
| Oxygen levels | I/A | CO2 levels | I/A |
| Diesel Particulate Regeneration | Y/N | PM levels | I/A |
| Ambient Air Temperature | I/A | | |
| Non ECM inputs | | Brake Specific Fuel Consumption ("BSFC") | I/A |
| Fuel Type | S/W | Thermal efficiency | I/A |
| Load requirement | A | | |
| Gross vehicle weight | A | | |
| GPS positioning | I/A | | |
| Wind data | I/A | | |
| Accelerometer reading | I/A | | |
| Calculated engine load | I/A | | |
| Expected topography | F/H/M | | |

Key
I = Instantaneous
A = Average or trip
Y = Yes
M = Mountainous
S = Summer fuel
W = Winter fuel
F = Flat
H = Hilly
N = No In another preferred embodiment, one of the means of determining the instant ideal gas ratio and volume is to use regression analysis comparing the fuel economy at various instant or time-averaged "engine loads" or according to other "independent variables" listed above. Care must be taken to ensure that the independent variable is in fact independent of the dependent variable (i.e. not 100% correlated or derived from the same sensor data as the dependant variable). Not surprisingly, fuel economy and engine loads are very well correlated, that is, as the engine load increases, the fuel economy (e.g., measured in miles per gallon of diesel fuel) declines. Surprisingly, however, the ideal hydrogen and oxygen ratios and the total gas volume are typically very distinctive and require hydrogen/oxygen ratios which are low at low loads and are trending higher towards high loads and total gas volumes which are high at low loads and trending lower towards high loads. Over much of the practical load operating range the hydrogen/oxygen ratios do not conform to stoichiometric ratios of hydrogen and oxygen as generated by water electrolysis, as used in the prior art, nor under other practical load situations, do the ratios conform to "non-elemental" ratios as used in the prior art.

Figure 3:
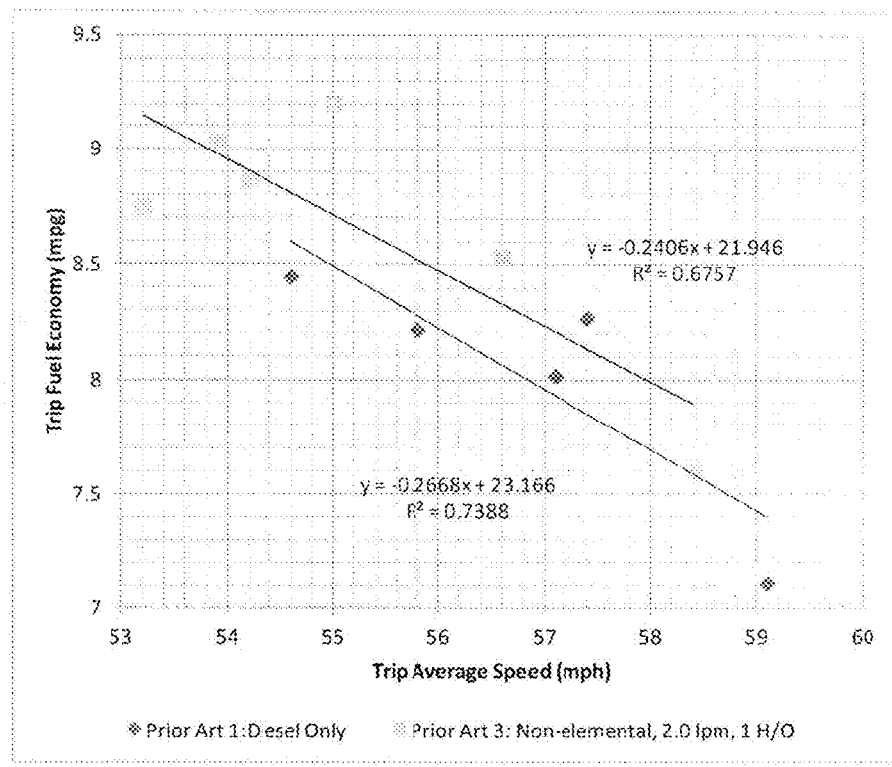
FIG. 3 is a graph depicting the trip fuel economy in mpg as a function of the average trip speed in mph for two distinct prior art operating modes, namely (i) diesel fuel only, (ii) diesel fuel with the addition of a fixed and constant volume of non-stoichiometric hydrogen and oxygen gas ($(H_2/O_2$ ratio=1/1).

FIG. 3 shows the fuel economy results using Prior Art 1 (no gas) and Prior Art 3 (non-elemental, hydrogen/oxygen ratio 1/1, 2 lpm) over a range of average speed conditions for a particular vehicle with varying loads and routes. Specifically, a tractor outfitted with a 12.7 liter Detroit Diesel Series 60 (pre-EGR technology) diesel engine was used to pull various payloads over various multiple day/week trips, routes, fuel types and across numerous geographical and climate conditions. Hydrogen and oxygen were provided by an on-board electrolysis device as described in Prior Art 3. The data clearly demonstrates the impact of the Prior Art 3 on fuel economy but also demonstrates that average speed can be used as an independent variable to determine optimal oxygen ratios, in spite of the large degree of "noise" caused by other variables (load weight, topography, fuel types, temperature, winds etc.).

Figure 4:
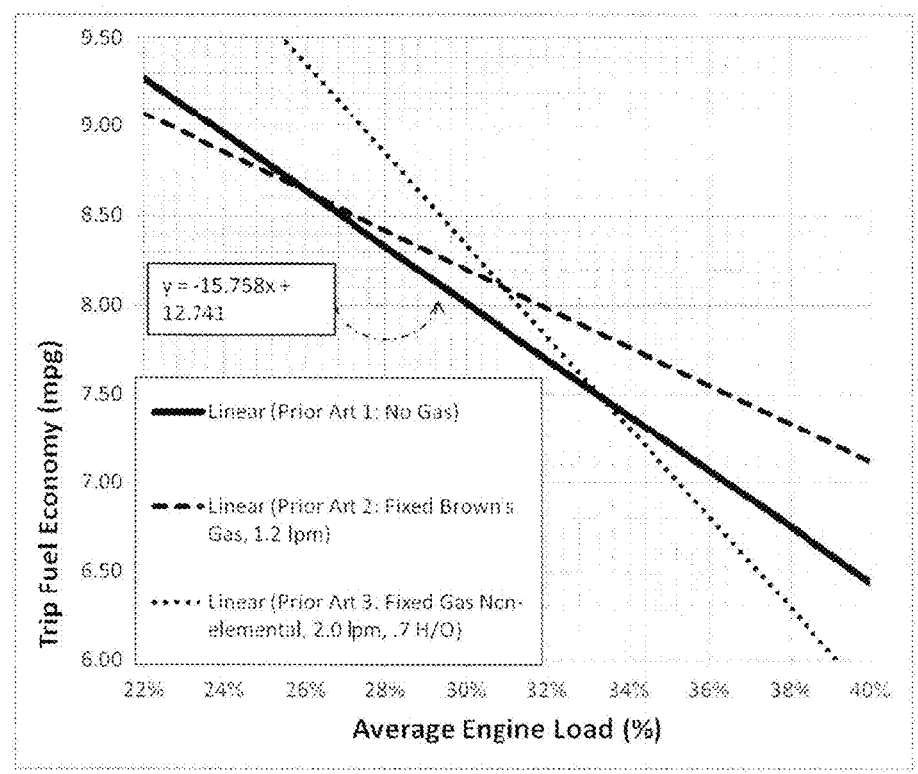
FIG. 4 is a graph depicting the fuel economy in mpg as a function of the average engine load for three distinct prior art operating modes, namely (i) diesel fuel only, (ii) diesel fuel with the addition of a fixed and constant volume of stoichiometric hydrogen and oxygen gas ($H_2/O_2$ ratio=2/1) and (iii) a fixed and constant volume of non-stoichiometric hydrogen and oxygen gas ($H_2/O_2$ ratio=2/3).

FIG. 4 shows the fuel economy results using Prior Art 1 (no gas), 2 (Brown's gas), and 3 (non-elemental, hydrogen/oxygen ratio of 2/3) over a practical range of average engine load conditions for a particular vehicle, pay load and test route. Specifically, a tractor outfitted with a 14.0 liter Cummins N14 (pre-EGR technology) diesel engine was used to pull a consistent payload along a consistent two legged trip (out and back from the depot) primarily at US Highway speeds (60 mph) with each leg of the trip taking 19 minutes. The tractor was put on "cruise control" to limit the driver impact on results. While the same test trip was used, the outbound leg of the trip was more downhill and the inbound portion uphill resulting in lower engine loads on the outbound trip. Moreover winds caused variations in the tractor/trailer drag further impacting the average or trip engine load. The trailer was outfitted with a "blaster", a specific calibration system that delivers hydrogen and oxygen gas independently in exact volumes and proportions to the air intake of the engine consistent with the elements A and B described in FIG. 1.

First a baseline was established showing the fuel economy of the tractor/trailer without the addition of any gases (Prior Art 1: No Gas). As expected fuel economy was inversely correlated with trip engine load and specifically conformed to a linear regression, where "average trip engine load"=x and "trip fuel economy"=y as described by the formula:

$$y=-15.758x+12.741 \text{ with an } R^2=0.8947$$

This is a strong correlation and this relationship is shown as a solid line in FIG. 4.

Another four trip segments (Prior Art 2: Fixed Brown's Gas) were done on the same route with a fixed quantity of Brown's gas (1.2 l/min, 2 parts hydrogen, 1 part oxygen). This data is represented by the "square" markers and dashed regression line. As described in the prior art, fuel economy improved appreciably approximately 0.2 mpg (2.5%) with an average trip load of 30%, and 0.45 mpg (6.25%) at an average trip engine load of 35%.

Another four trip segments (Prior Art 3: Fixed Non-Elemental Gas) were done on the same route with a fixed quantity of gas (2.0 l/min) and a non-elemental mix of 2 parts hydrogen for every 3 parts oxygen. This data is represented by the "diamond" markers and dotted regression line. As described in the prior art, fuel economy improved appreciably at lower average engine loads, (0.35 mpg, 4.4% at 30% average engine load) but declined from the baseline at higher average engine loads (0.015 mpg, 2.1% at 35% engine load).

The results indicate that prior art 2 provides for enhanced fuel economy at high engine loads over diesel fuel only operation while reducing the fuel economy at low engine loads whereas prior art 3 provides for an enhanced fuel economy at low engine loads while reducing the fuel economy towards higher engine loads. As FIG. 4 indicates all prior art on-board hydrogen generation systems fail to consistently result in the desired fuel economy improvement over the entire engine load range. This illustrates why prior art on-board hydrogen generation systems at time have been reported to provide a fuel economy benefit while the same systems operated under different conditions at times have been reported to provide no improvement or even reduced fuel economy.

The tables below demonstrate the invention and the consistent and substantial improvements obtained in fuel economy for a monitoring and control system according to this invention. In this example, the same tractor/truck described above was used to generate the data. First, "Program 1" was executed, using solely the average trip engine load data and resulting fuel economy over a one week period. Regression analysis was used to isolate "outliers", that is specific operating zones in which fuel economy improves appreciably for a given average trip engine load. Program 1 produced a data look-up table, an excerpt of which is shown below as Table 1 for those engine load that are most prevalent for this tractor/trailer in service. This table uses an independently supplied "instantaneous engine load" to determine the ideal gas ratio and volume. This is a value that was available on the international CAN protocol. Note that depending on the instantaneous engine load value, varying volumes and ratios of gas additions are determined

TABLE 2

Illustrative Partial Output of Program 1

| Instantaneous Engine Load [%] | | Optimum Gas Volume | Optimum Gas Ratio |
|---|---|---|---|
| Min | Max | (lpm) | (H2/O2) |
| 26.0% | 27.9% | 3.0 | 0.67 |
| 28.0% | 29.9% | 2.1 | 0.75 |
| 30.0% | 31.9% | 1.8 | 0.90 |
| 32.0% | 33.9% | 1.2 | 1.50 |
| 34.0% | 35.9% | 1.5 | 1.50 |
| 36.0% | 37.9% | 1.2 | 2.00 |

Table 3 shows a new data set of actual instantaneous engine load and fuel economy values using the gas volumes and ratios described in Table 2 for 20 specific segments of trips. This data is generated from the same truck running on a variety of different routes and loads. These "segments" were at least 10 miles in length and represented over 85% of fuel consumption for this specific truck configuration and operating profile. The table also shows the percentage improvement in fuel economy over the baseline performance (prior art 1: without any gas addition), prior art 2 (fixed quantity of Brown's gas), and prior 3 (fixed quantity of non-elemental gas) using the regression analysis described on FIG. 4. The invention improved fuel economy relative to prior art for all segments driven. On average, fuel economy improved 11.8% relative to the diesel engine without gas (Prior Art 1), 6.5% relative to the fuel economy with a fixed volume of Brown's Gas (Prior Art 2), and 11.9% relative to the fuel economy with fixed "non-elemental" gas additions (Prior Art 3).

TABLE 3

Fuel Economy Results Using the Invention on
the Same Truck with Different Routes and Loads

| Segment | Inst. Engine Load [%] | Gas Volume (lpm) | Gas Ratio (H2/O2) | Fuel Economy (mpg) | Inc. vs PA 1 [%] | Inc. vs PA 2 [%] | Inc. vs PA 3 [%] |
|---|---|---|---|---|---|---|---|
| 1 | 27.6 | 3.00 | 0.67 | 9.27 | 10.7 | 9.6 | 3.4 |
| 2 | 36.0 | 1.50 | 1.50 | 7.57 | 7.3 | 0.3 | 11.1 |
| 3 | 36.4 | 1.20 | 2.00 | 7.75 | 10.9 | 3.3 | 15.5 |
| 4 | 36.9 | 1.20 | 2.00 | 7.76 | 12.2 | 4.2 | 17.9 |
| 5 | 33.7 | 1.20 | 1.50 | 8.21 | 10.7 | 5.3 | 10.9 |
| 6 | 35.8 | 1.50 | 1.50 | 8.08 | 14.0 | 6.8 | 17.7 |
| 7 | 33.5 | 1.20 | 1.50 | 8.37 | 12.4 | 7.1 | 12.3 |
| 8 | 28.9 | 2.10 | 0.75 | 9.07 | 11.0 | 9.0 | 5.1 |
| 9 | 36.0 | 1.50 | 1.50 | 7.78 | 10.3 | 3.2 | 14.3 |
| 10 | 37.8 | 1.20 | 2.00 | 7.59 | 12.1 | 3.3 | 19.6 |
| 11 | 34.9 | 1.50 | 1.50 | 8.20 | 13.4 | 6.9 | 15.6 |
| 12 | 37.2 | 1.20 | 2.00 | 7.45 | 8.6 | 0.5 | 14.6 |
| 13 | 36.5 | 1.20 | 2.00 | 7.89 | 13.1 | 5.3 | 18.0 |
| 14 | 32.4 | 1.20 | 1.50 | 8.65 | 13.5 | 8.9 | 11.8 |
| 15 | 31.9 | 1.80 | 0.90 | 8.84 | 14.8 | 10.6 | 12.4 |
| 16 | 27.6 | 3.00 | 0.67 | 9.17 | 9.4 | 8.3 | 2.2 |
| 17 | 27.2 | 3.00 | 0.67 | 9.68 | 14.6 | 13.8 | 6.7 |
| 18 | 33.8 | 1.20 | 1.50 | 8.26 | 11.6 | 6.1 | 11.9 |
| 19 | 31.2 | 1.80 | 0.90 | 8.96 | 14.7 | 11.0 | 11.4 |
| 20 | 30.1 | 1.80 | 0.90 | 8.77 | 9.9 | 7.1 | 5.4 |
| Average | | | | 8.36 | 11.8 | 6.5 | 11.9 |

Figure 5:
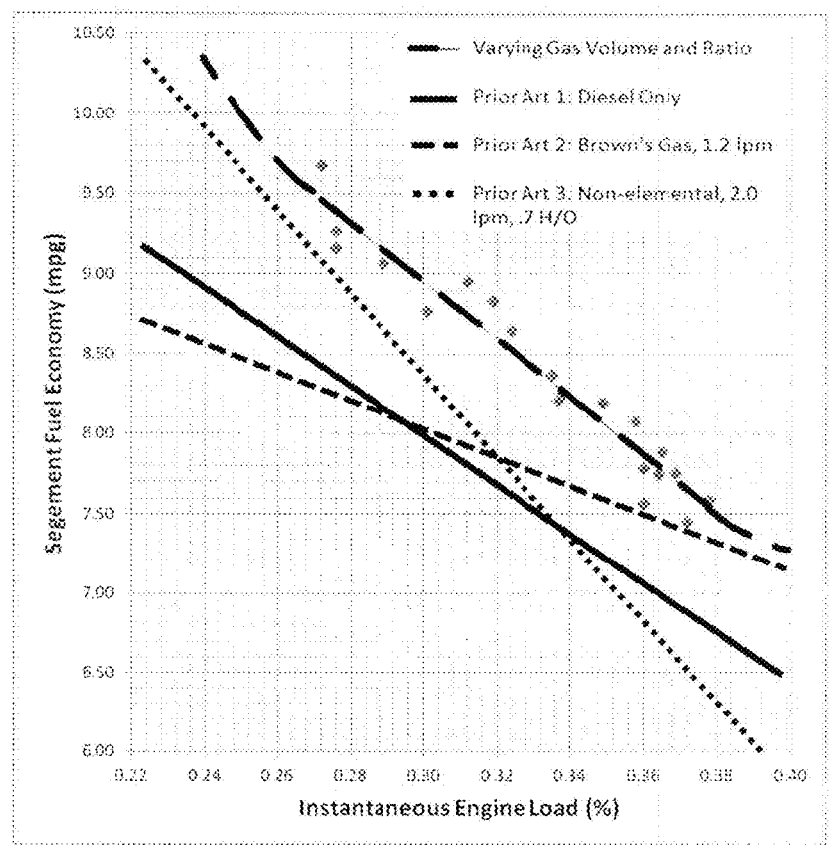
FIG. 5 is a graph depicting the load-specific fuel economy in mpg as a function of the instant engine load condition for three distinct prior art operating modes and the inventive operating mode wherein the ratio of hydrogen and oxygen gas and the total volume added gas are predetermined on an ongoing basis and adjusted for each specific "instant load condition" for the particular test engine used.

FIG. 5 shows the same data in graphical form and also shows the prior art regression analysis for reference.

The data demonstrate the impact of this invention on fuel economy over the entire engine load range. Specifically, the large dashed line in FIG. 5 shows the new "regression line" achieved with the specific optimization of gas volumes and ratios depending on one specific operating datum (instantaneous engine load). The gas setting for higher engine loads of between 36-37.9% is set at a total volume of gas of 1.2 liters per minute ("lpm" or "l/min") and a ratio of 2.0 $H_2$ to $O_2$ (i.e. the stoichiometric ratio from water electrolysis) at highway speeds and a fuel economy of between 7.4 to 7.9 mpg with similar loads (up from approximately 6.8-7.2 mpg without gas addition) was achieved. As the load conditions change, different gas volumes and ratios were introduced. At an engine load of between 30-31.9%, the total gas volume was increased to 1.8 lpm in a ratio of 0.90 $H_2$ to $O_2$ (i.e. a "non-elemental" mix) at highway speeds, and a fuel economy of between 8.75 and 8.95 mpg (up from 7.7 to 8.0 mpg without gas addition) was achieved. For this engine and transmission set-up, a relatively stable amount of hydrogen was required (between 0.7 to 1.2 lpm), while more oxygen was required to optimize fuel economy at lower engine loads and a higher range of oxygen was required (0.4 to 1.8 lpm). As illustrated above, surprisingly, the best fuel economy and thermal efficiency, at lower engine loads of the engine is achieved by leaning the fuel/air ratio more than the high load scenario.

It should also be noted that higher total gas volumes do not necessarily improve fuel efficiency in contradiction to the results of Bari et. al. using Brown's gas. The maximum total gas addition needed for this engine is 3.0 lpm at lower instantaneous engine loads. The ideal total gas addition generally declines as engine load increases except for the portion between loads of 34-35.9%. To further demonstrate this point, this same truck was operated with twice the total volume of Brown's Gas (2.4 lpm) at an engine load of 38% and only achieved fuel economy of 6.67 mpg (versus approximately 7.5 with the invention and half the total gas volume). Again, this is a surprising result given Prior Art 2 mentioned earlier and indicates that the relationship is non-linear for this truck. Segments 5, 7, 14, 18 of Table 3 show the fuel economy at a total volume of gas of 1.2 lpm for a range of loads of 32-33.9% in contrast to segments 2, 6, 9, 11 where total gas is increased to 1.5 lpm for maximum benefit at loads of 34-35.9%, a non-linear portion of the relationship.

Table 4 below shows the range of parameters suggested for a few engines across a variety of load profiles. Note that ideal ratios and volumes of gases are different for different engines thus requiring the invention herein to optimize fuel economy for different engines, load profiles, transmission types, fuel types etc., the primary function of "Program 1" in FIG. 2.

TABLE 4

Ideal Ranges of Gas Volumes and Ratios for Selected Diesel Engines

| Engine Manufacturer | Engine Displacement | EGR | Gas Flow (lpm) Min | Max | H2/O2 Ratio Min | Max | Fuel |
|---|---|---|---|---|---|---|---|
| Detroit Diesel S60 | 12.7 l | No | .9 | 4.0 | 0.00 | 2.00 | Diesel |
| Detroit Diesel | 14.0 l | Yes | 1.0 | 5.0 | 0.00 | 1.50 | Diesel |
| Cummins N14 | 14.0 l | No | 0.8 | 3.5 | 0.75 | 2.00 | Diesel |
| Cummins ISX500 | 14.0 l | Yes | 2.0 | 4.8 | 0.25 | 2.00 | Diesel |
| Wartsila 18V46 | 1,723 l | No | 25 | 300 | 0.00 | 3.50 | HFO |

The data clearly demonstrate that significant improvements in combustion efficiency are possible with this invention resulting in fuel economy improvements of between 2% and 25% over the prior art 1, and approximately 3-20% over the prior art 2 (fixed Brown's Gas) and 2-25% over the prior art 3 (fixed non-elemental gas). Most importantly, unlike the prior art, this invention will result in fuel usage that is between 4% to 20% lower under all, not just selected load conditions, resulting in greenhouse gas generation that in turn is 4% to 20% lower relative to a diesel engine without the inventive dynamic hydrogen and oxygen gas addition.

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. A monitoring and control system for improving fuel economy of an internal combustion engine which combusts a carbon based fuel with air supplied by an air intake, the system comprising:
   a first source for supplying hydrogen gas;
   a second source for supplying oxygen gas, the second source being separate from the first source;
   a third source for supplying the carbon based fuel;
   a metering subsystem coupled to the first source, the second source and the air intake of the internal combustion engine, the metering subsystem adapted to independently select pre-determined volumes of hydrogen gas and oxygen gas in a pre-determined ratio from corresponding first and second sources, and provide the selected hydrogen and oxygen gases to the air intake of said internal combustion engine for combustion with the carbon based fuel; and
   a control logic subsystem adapted to continuously monitor engine operating parameters to determine the pre-determined ratio of hydrogen gas to oxygen gas and the pre-determined total volume thereof to be injected into the air intake of said internal combustion engine to enhance the fuel economy thereof,
   wherein the first source and the second source are located on-board and in proximity to the internal combustion engine to respectively supply, via the metering subsystem, a rapidly changing determine of the pre-determined ratio and the volumes of the hydrogen and oxygen gases by the control logic subsytem, and
   wherein the metering subsystem, being controlled by the control logic subsystem, is automatically configured to select higher volumes of hydrogen gas and oxygen gas, and a lower ratio of hydrogen gas to oxygen gas if the control logic subsystem detects an instant engine load lower than a threshold load than if the control logic subsystem detects an instant engine load higher than the threshold load.

2. The monitoring and control system according to claim 1, wherein said internal combustion engine is a compression ignition engine having at least one combustion chamber in which fuel is injected and air is compressed for combustion of the fuel.

3. The monitoring and control system according to claim 2, wherein the engine operating parameters are instant engine load and/or fuel flow rate and the fuel economy is improved by at least 2.5% when compared to fuel economy without the monitoring and control system in the instant load range between 0 and 100%.

4. The monitoring and control system according to claim 3, wherein the monitoring and control system is installed on a vehicle and said hydrogen gas and oxygen gas are generated on-board the vehicle electrochemically from energy provided by the fuel.

5. The monitoring and control system according to claim 3, wherein said instant load range is between 20% and 50% in the case of transport engines, and between 20% and 100% in the case of power generators and all, other engines.

6. The monitoring and control system according to claim 3, wherein fuel mileage is improved by at least 5%.

7. The monitoring and control system according to claim 1, wherein said ratio between the hydrogen gas and the oxygen gas varies in the range of 10/1 to 1/1.0.

8. The monitoring and control system according to claim 1, wherein said total volume of the hydrogen gas and the oxygen gas is in the range of 0.01 to 5 liter per minute per liter of engine displacement.

9. The monitoring and control system according to claim 1, wherein the control logic subsystem and metering subsystem are automated and wherein the monitoring time interval is equal to or less than once a day.

10. The monitoring and control system according to claim 9, wherein the monitoring time interval is approximately 1 second or less.

11. The monitoring and control system according to claim 1, wherein the control logic subsystem is located at a central data hub remote from the internal combustion engine, and data between the control logic subsystem and the internal combustion engine is transmitted wirelessly.

12. The monitoring and control system according to claim 1, wherein the control logic subsystem is located proximate to the internal combustion engine.

13. The monitoring and control system according to claim 1, wherein the control logic subsystem uses regression analysis of at least one independent variable, selected from the engine operating parameters, regressed against at least one dependent variable, selected from the engine operating parameters, to determine optimal gas ratios and volume settings,
   wherein the at least one independent variable is selected from the group consisting of: instantaneous drive engine load, average drive engine load, average percentage time at load, average overall engine load, instantaneous revolutions per minute, average revolutions per minute, average percentage time at revolutions per minute, instantaneous speed, average speed, vehicle speed limit, instantaneous trip miles travelled, average trip miles travelled, instantaneous odometer mileage, idle, average idle percentage, instantaneous percentage EGR, average percentage EGR, instantaneous oxygen levels, average oxygen levels, diesel particulate regeneration, instantaneous ambient air temperature, average ambient air temperature, fuel type, average load requirement, average gross vehicle weight, instantaneous GPS positioning, average GPS positioning, instantaneous wind data, average wind data, instantaneous accelerometer reading, average accelerometer reading, instantaneous calculated engine load, average calculated engine load, flat expected topography, hilly expected topography, mountainous expected topography, and combinations thereof, and
   wherein the at least one dependent variable is selected from the group consisting of instantaneous or average fuel economy, fuel consumption, brake specific fuel consumption, power generation per BTU, thermal efficiency, NOx, NMHC, CO, CO2, particulate matter concentrations, and combinations thereof.

14. The monitoring and control system according to claim 1, wherein the control logic subsystem uses a statistical method on engine operating parameters to determine the optimal gas ratio and volume settings for improved combustion, fuel economy or thermal efficiency.

15. The monitoring and control system according to claim 1, further comprising at least one of a storage tank to store excess hydrogen and/or oxygen, and an auxiliary power system which converts excess hydrogen into electrical power.

16. The monitoring and control system according to claim 1, further comprising an electrochemical oxygen concentrator which cathodically reduces air and anodically liberates pure oxygen.

17. The monitoring and control system according to claim 2, further comprising a recalibrator to recalibrate the engine's reaction to oxygen in the exhaust so as to improve the impact of said monitoring and control system on fuel economy, such recalibrator including a specialized circuit that modifies readings from one or more oxygen sensors, a means of adjusting the oxygen reading, or engine ECM software changes that accomplish same.

18. A method for improving the fuel economy of an internal combustion engine which combusts a carbon based fuel with air supplied by an air intake, the method comprising:

continuously monitoring, by a control logic subsystem, engine operating parameters of the internal combustion engine;

determining, by the control logic subsystem, a ratio of hydrogen gas to oxygen gas to be added to the air intake of the internal combustion engine based on the engine operating parameters;

determining, by the control logic subsystem, a total hydrogen gas and oxygen gas volume to be added to the air intake based on the engine operating parameters; and independently selecting, by a metering subsystem coupled to the control logic subsystem, the determined ratios and total volume of hydrogen gas and oxygen gas from respective separate sources and providing the selected hydrogen and oxygen gases to the air intake of said internal combustion engine for combustion with the carbon based fuel, wherein respective sources of the hydrogen gas and oxygen gas are located on-board and in proximity to the internal combustion engine to respective supply, via the metering subsystem, a rapidly changing determination of the determined ratio and the total volume of the hydrogen and oxygen gases by the control logic subsystem;

determining, by the control logic subsytem, an instant engine load based on the engine operating parameters, wherein if the instant engine load is detected to be lower than a threshold load, higher volumes of hydrogen gas and oxygen gas, and a lower ratio of hydrogen gas to oxygen gas is provided to the air intake than if the instant engine load is detected to be higher than the threshold load.

19. The method of claim 18, further comprising the step of providing at least a part of the hydrogen gas and the oxygen gas by means of water electrolysis.

* * * * *

UNITED STATES PATENT AND TRADEMARK OFFICE
CERTIFICATE OF CORRECTION

PATENT NO. : 10,253,685 B2
APPLICATION NO. : 14/423602
DATED : April 9, 2019
INVENTOR(S) : Robert Alexander, Geoffrey Sheerin and Klaus Tomantschger Page 1 of 1

It is certified that error appears in the above-identified patent and that said Letters Patent is hereby corrected as shown below:

In the Claims

Claim 1, Column 15, Line 39, "...changing determine of..." should read -- changing determination of --

Claim 18, Column 18, Line 14, "...respective supply..." should read -- respectively supply --

Signed and Sealed this
Tenth Day of September, 2019

Andrei Iancu
*Director of the United States Patent and Trademark Office*